United States Patent [19]

Stanek

[11] Patent Number: 5,203,735
[45] Date of Patent: Apr. 20, 1993

[54] VACUUMIZED INTERNAL SIZING RING ASSEMBLY AND METHOD OF USE

[75] Inventor: Thomas G. Stanek, Roswell, Ga.

[73] Assignee: W. R. Grace & Co.-Conn., Duncan, S.C.

[21] Appl. No.: 806,974

[22] Filed: Dec. 12, 1991

[51] Int. Cl.⁵ .............................................. A22C 11/02
[52] U.S. Cl. ......................................... 452/38; 452/37
[58] Field of Search .................................. 452/38, 37

[56] References Cited

U.S. PATENT DOCUMENTS

| | | | |
|---|---|---|---|
| 4,512,059 | 4/1985 | Beckman | 17/45 |
| 4,599,764 | 7/1986 | Knepshield | 17/41 |
| 4,646,386 | 3/1987 | Dreisin | 17/49 |
| 4,949,430 | 8/1990 | Stanek | 17/41 |
| 4,958,412 | 9/1990 | Stanek | 452/38 |

Primary Examiner—Willis Little
Attorney, Agent, or Firm—William D. Lee, Jr.; Jennifer L. Skord; Mark B. Quatt

[57] ABSTRACT

Internal sizing ring assembly and method for its use on a stuffing horn to extract air from within a tube-like casing having a closed end during stuffing operations, includes a sizing ring having an inner mounting surface adapted to conform to the outer surface of the stuffing horn, a peripheral casing-expanding surface to expand the casing into an open configuration, and front and back surfaces; and vacuum means defined by at least one port extending through the sizing ring and a longitudinally extendable tube connected to the port and in cooperation with a vacuum source. The internal sizing ring assembly can further include a hollow mold having an internal cross-section configured to slidingly receive the sizing ring with the casing effectively sealed between the two for producing shaped products substantially free of air voids.

18 Claims, 7 Drawing Sheets

VACUUMIZED INTERNAL SIZING RING ASSEMBLY AND METHOD OF USE

BACKGROUND OF THE INVENTION

1. Field of the Invention

The present invention relates to internal sizing ring assemblies for use in stuffing tube-like casings, and in particular apparatus and methods for extracting air trapped within a tube-like casing during stuffing operations for producing a substantially air-free shaped product.

2. Description of the Prior Art

Certain food products, such as sausages, cheeses, and deli meats, are produced by stuffing or discharging an emulsion of the desired food product into a flexible, tube-like casing. This stuffing operation is typically performed on a stuffing machine having a pump for forcing the emulsion into the casing. Conventionally, the outlet of the stuffing machine is provided with a stuffing horn, which is a cylindrical tube having an outer surface and a discharge end, through which the emulsion is discharged.

The stuffing horn generally serves two functions. The stuffing horn directs the discharge of the emulsion, and provides a support surface onto which the tube-like casing may be inserted in a sleeve-like manner. The tube-like casing to be stuffed may be either a shirred length of casing, commonly referred to as a shirred stick, or an unshirred, precut casing segment. Likewise, the tube-like casing may be open at both ends, or open only at one end with the other end closed for positioning over the discharge end of the stuffing horn.

Various methods and arrangements are known for performing stuffing operations; specific examples are disclosed in U.S. Pat. Nos. 4,512,059, 4,599,764, 4,646,386, and 4,949,430. One conventional method utilizes an overhorn assembly preloaded with a shirred stick of tube-like casing. The overhorn assembly is adapted to be securely mounted onto the stuffing horn and includes an internal sizing ring fixed on one end, with the tube-like casing arranged to pass over the sizing ring during the discharge of emulsion. The conventional overhorn assembly is configured to open the tube-like casing as it passes over the internal sizing ring to eliminate snags or wrinkles in the tube-like casing. The preloaded shirred stick is either initially open-ended so as to be pulled over the internal sizing ring and sealed closed adjacent the discharge end of the stuffing horn in preparation for stuffing operation, or initially provided with a closed end to be positioned adjacent the discharge end of the stuffing horn. Further, the sizing ring is intended to uniformly feed out or release the casing as the discharge of emulsion forces the closed end of the casing away from the discharge end of the stuffing horn. Once a desired length of casing is stuffed, the casing is sealed shut adjacent the discharge end of the stuffing horn, and severed from the remainder of casing still loaded on the stuffing horn.

In actual stuffing operations, however, the emulsion discharged within the tube-like casing is frequently riddled with air voids. The air voids may be due to sagging or excessive slack in the tube-like casing as it is released from the conventional sizing ring, or the air voids may be created by air initially trapped within the emulsion prior to discharge from the stuffing horn. In either event, portions of the product within the stuffed casing must be down-graded in quality due to the detrimental effects of the air voids, notably destroying the appearance of the product and increasing the risk of bacterial contamination. This down-grading results in the product being sold at a lower price, or requiring reprocessing in an attempt to produce a substantially air-free stuffed casing.

A similar problem occurs in the process of stuffing a tube-like casing for producing a shaped product, such as rectangular loaves or the like. Typically, the method of producing shaped products involves the conventional steps outlined above. However, rather than sealing the casing once a predetermined length of casing is stuffed, the conventional method of producing shaped products further includes pulling an additional length of casing from the stuffing horn. The partially stuffed casing is then sealed shut and pressed inside a container mold to force the emulsion within the casing to conform to the internal cross-section of the container mold.

Inherently air becomes trapped within the casing as the additional length of casing is pulled from the stuffing horn. As such, air voids are naturally prevalent throughout the shaped product, particularly along the end of the casing which was freely pulled from the stuffing horn. Again these air voids result in down-grading of the product, a greater expense to the manufacturer, and a greater health risk to the consumer.

SUMMARY OF THE INVENTION

The general object of the invention is to provide an improved internal sizing ring assembly for use on a stuffing machine, which is capable of extracting air trapped within a tube-like casing during stuffing operations.

Another object of the invention is to provide an internal sizing ring assembly capable of extracting air trapped within a tube-like casing, which is readily adaptable for mounting on stuffing horns of conventional stuffing machine designs.

A further object of the invention is to provide an internal sizing ring assembly capable of producing shaped products which are substantially free of air voids.

An additional object of the invention is to provide an internal sizing ring assembly capable of extracting air trapped within a tube-like casing, which is simple to operate and inexpensive to manufacture.

A further general object of the invention is to provide a method for extracting air trapped within a tube-like casing during stuffing operations.

Another object of the invention is to provide a method for producing shaped products which are substantially free of air voids.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the present invention, as embodied and broadly described herein, the apparatus includes a vacuumized internal sizing ring assembly for use on a stuffing machine to extract air from a tube-like casing having a closed end. The stuffing machine on which the vacuumized internal sizing ring assembly is intended to be used has a stuffing horn with an outer surface adapted to support the casing and a discharge end against which the closed end of the casing is positioned in preparation for stuffing operation. The vacuumized internal sizing ring assembly includes a sizing ring having an inner mounting surface adapted to conform to the outer surface of the stuffing horn and a peripheral casing-expanding surface for expanding the casing into an open configuration as the casing is withdrawn from the stuffing horn during the stuffing operation; and vacuum means associated with the sizing ring for extracting air trapped within the casing between the closed end and the sizing ring.

More specifically, the preferred embodiment of the vacuum means of the present invention includes at least one port extending through the sizing ring, and a tube connected to the port and adapted to be extendable longitudinally along the outer surface of the stuffing horn for extracting the trapped air from within the casing.

Further in accordance with the present invention and broadly described herein, the method of stuffing a tubelike casing having a closed end using a stuffing horn having an outer surface and a discharge end, includes the steps of mounting a sizing ring assembly on the outer surface of the stuffing horn proximate the discharge end, with the sizing ring assembly including vacuum means for extracting air; inserting the casing onto the stuffing horn with the closed end positioned adjacent the discharge end of the stuffing horn and the casing displaced over the sizing ring; discharging emulsion from the stuffing horn into the casing; and extracting through the vacuum means of the sizing ring assembly substantially any air trapped within the casing between the closed end and the sizing ring assembly.

As embodied herein, two alternate preferred methods are presented for producing shaped products. In a first embodiment, referred as slack-filling, the method further includes the steps of ceasing the discharge of emulsion after a desired quantity of emulsion has been discharged; pulling a predetermined unfilled length of the casing from the stuffing horn with the casing of sufficient overall length to remain displaced over the sizing ring assembly; extracting substantially any air remaining within the unfilled length of the casing; and sealing the casing adjacent the discharge end of stuffing horn with the emulsion substantially free of air. Further, the method of producing the shaped product includes placing the stuffed, substantially air-free casing in a container mold; and compressing the stuffed, substantially air-free casing to force the emulsion to conform to the internal cross-section of the container mold.

In the alternate embodiment of the present invention, referred as horizontal mold loading, the method steps include selecting the sizing ring assembly with a sizing ring similar in shape to that desired for the shaped product, and choosing a hollow mold having an internal cross-section configured to slidingly receive the sizing ring with the casing positioned therebetween; and inserting the hollow mold onto the stuffing horn and slidingly over the sizing ring and casing so that the casing is effectively sealed against the sizing ring. Likewise, the horizontal mold loading method further includes discharging the emulsion into the casing until a desired length of casing has been stuffed; extracting through the vacuum means of the sizing ring assembly substantially any trapped air remaining within the casing; and closing the casing adjacent the discharge end of stuffing horn In this manner, the discharging and extracting steps result in the emulsion substantially conforming to the internal cross-section of the hollow mold while remaining substantially free of air as the hollow mold is slidingly forced across the sizing ring by the emulsion.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the vacuumized stuffing ring assembly and methods of use thereof, and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

The Sizing Ring Assembly

In accordance with the present invention, the vacuumized internal sizing ring assembly is intended for use on a stuffing machine to extract air from a tube-like casing having a closed end. Generally, the stuffing machine has a stuffing horn with an outer surface adapted to support the casing and a discharge end against which the closed end of the casing is positioned in preparation for stuffing operation.

The sizing ring assembly made in accordance with the present invention includes a sizing ring having an inner mounting surface adapted to conform to the outer surface of the stuffing horn for mounting the sizing ring proximate the discharge end of the stuffing horn with the casing displaced over the sizing ring, and a peripheral casing-expanding surface to expand the casing into an open configuration as the casing is withdrawn from the stuffing horn during the stuffing operation.

Figure 1:
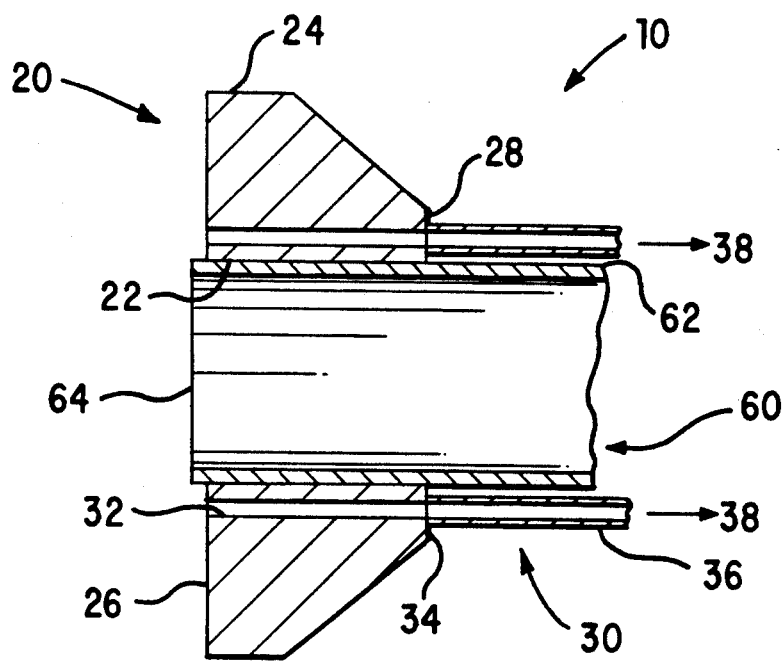
FIG. 1 is a cross-sectional schematic side view of a representative embodiment of a vacuumized internal sizing ring of the present invention with substantially longitudinal ports.
Figure 2:
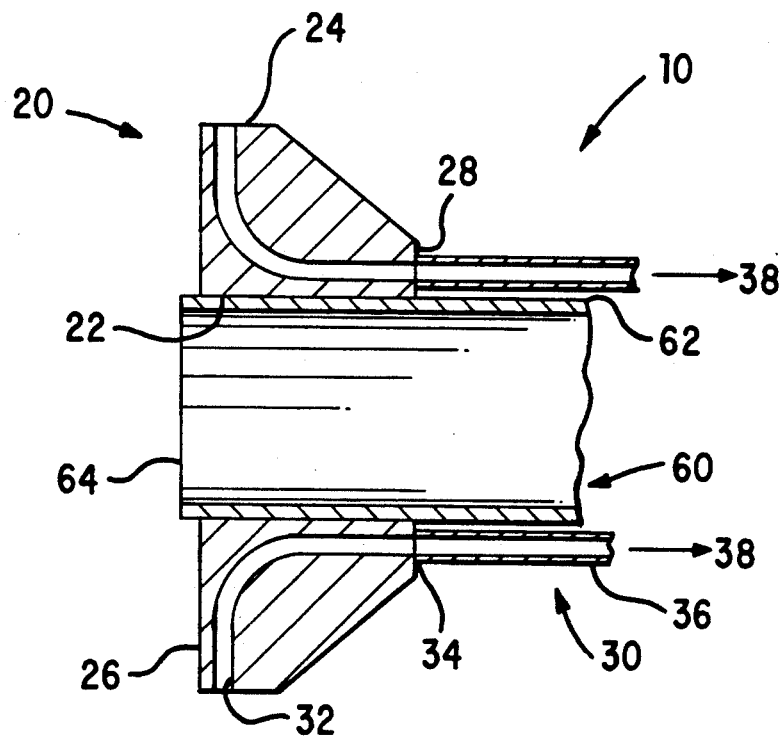
FIG. 2 is a cross-sectional schematic side view of another representative embodiment of a vacuumized internal sizing ring of the present invention with substantially radial ports.

As embodied herein, and with initial reference to FIGS. 1 and 2, the sizing ring assembly of the present invention, generally designated by reference character 10, is intended to be mounted on the outer surface 62 of a conventional stuffing horn 60, which is cylindrical in shape and standardized in size or diameter. As such, the sizing ring assembly 10 includes a sizing ring 20 having an inner mounting surface 22 which is also cylindrical in shape and of appropriate size to match the outer surface 62 of a conventional stuffing horn 60, as best seen in FIGS. 1 and 2. Of course, if an alternate stuffing horn cross-section were utilized, a conforming inner mounting surface 22 of similar shape and size could easily be incorporated into the sizing ring 20 of the present invention. It is noted that the sizing ring 20 embodied herein may be secured along the length of the stuffing horn 60, or may remain free to move along the outer surface 62 of the stuffing horn 60, if desired. An example of a preferred freely sliding sizing ring configuration is set forth in the commonly-owned, copending application entitled FLOATING INTERNAL SIZING RING by Thomas G. Stanek filed with the U.S. Patent and Trademark Office on Dec. 12, 1991.

Figure 3A:
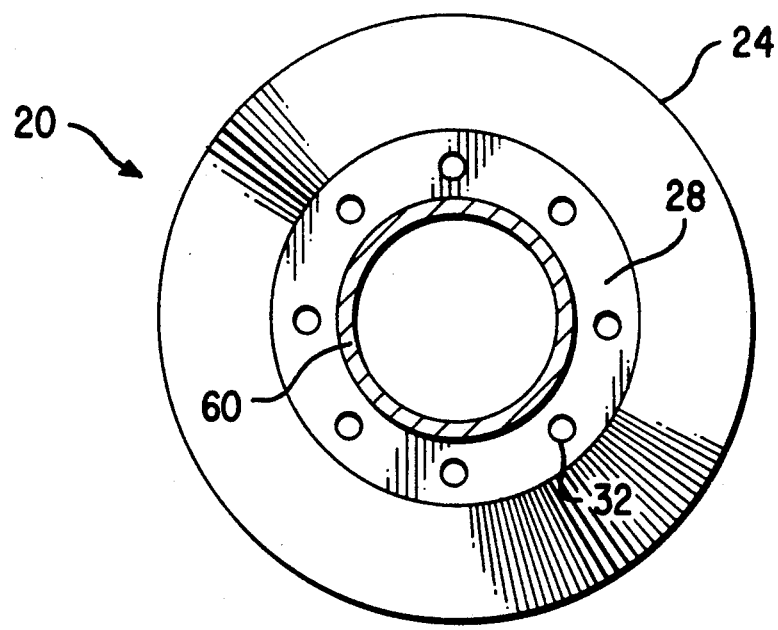
FIG. 3A is a representative back view of a circular-shaped embodiment of the vacuumized internal sizing ring of FIG. 1.

As further embodied herein, the sizing ring 20 includes a peripheral casing-expanding surface 24 to expand the casing 70 into an open configuration as the casing 70 is withdrawn from the stuffing horn 60 during the stuffing operation. As illustratively presented in FIG. 3A by example and not limitation, a preferred embodiment of the casing-expanding surface 24 is cylindrical in shape and similar in diameter to that of the tube-like casing 70. In this manner, and with the sizing ring 20 located proximate the discharge end 64 of the stuffing horn 60, the tube-like casing 70 is forced into a fully open configuration just prior to being stuffed with emulsion 80. This arrangement ensures efficient stuffing of the tube-like casing 70, without risk of inadvertent snags in the casing 70 which in turn may block the discharge of emulsion 80.

Figure 3B:
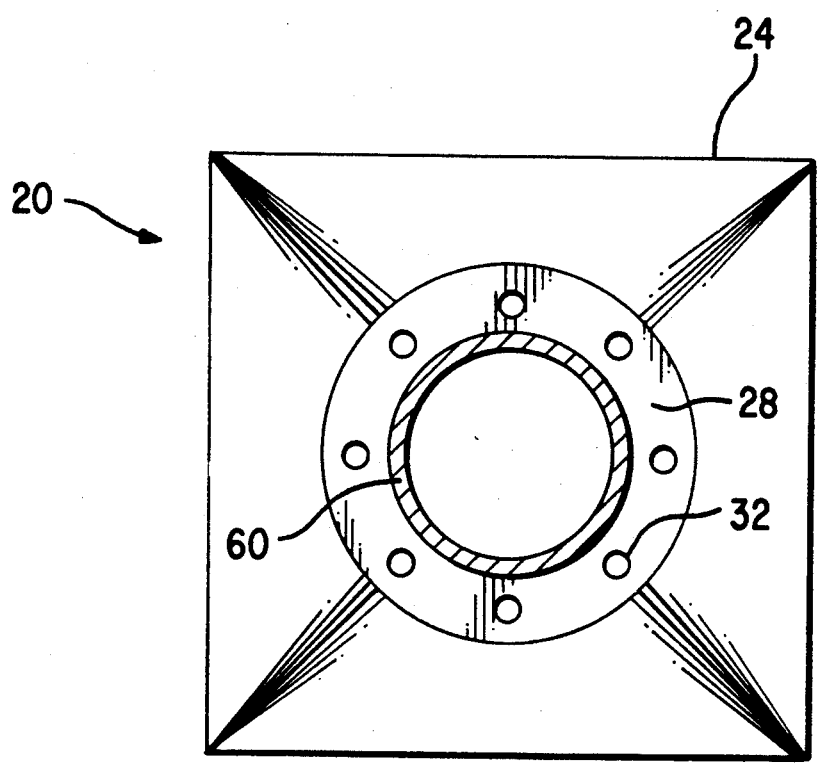
FIG. 3B is a representative back view of a rectangularshaped embodiment of the vacuumized internal sizing ring of FIG. 1.

An alternate preferred embodiment of the casing-expanding surface 24 is illustratively shown by example in FIG. 3B. As seen in FIG. 3B, the casing-expanding surface 24 may be polygonal in shape, the only limitation being that the periphery of the casing-expanding surface can not exceed the circumference of the tube-like casing 70. As will be discussed in detail below regarding horizontal mold loading, the shape of the casing-expanding surface 24 can be selected to match that desired for the shaped product. That is, if the shaped product&is to be a four inch by six inch loaf, the preferred shape of the casing-expanding surface 24 is approximately a four inch by six inch rectangle.

Figure 4A:
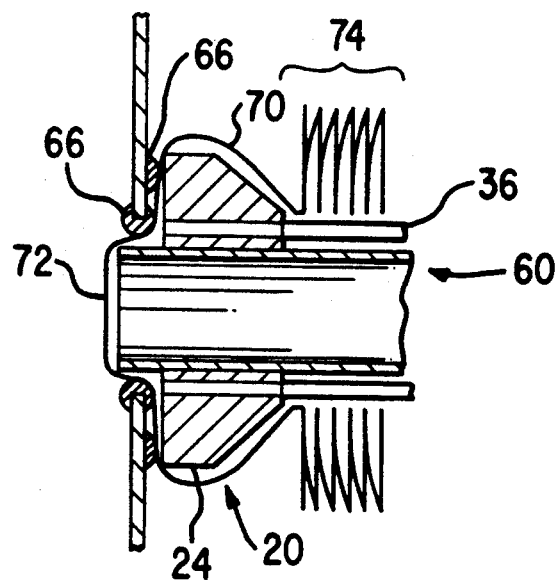
FIG. 4A is a cross-sectional view of the slack-filling method of the invention, which shows the tube-like casing inserted over the stuffing horn and sizing ring assembly.
Figure 5A:
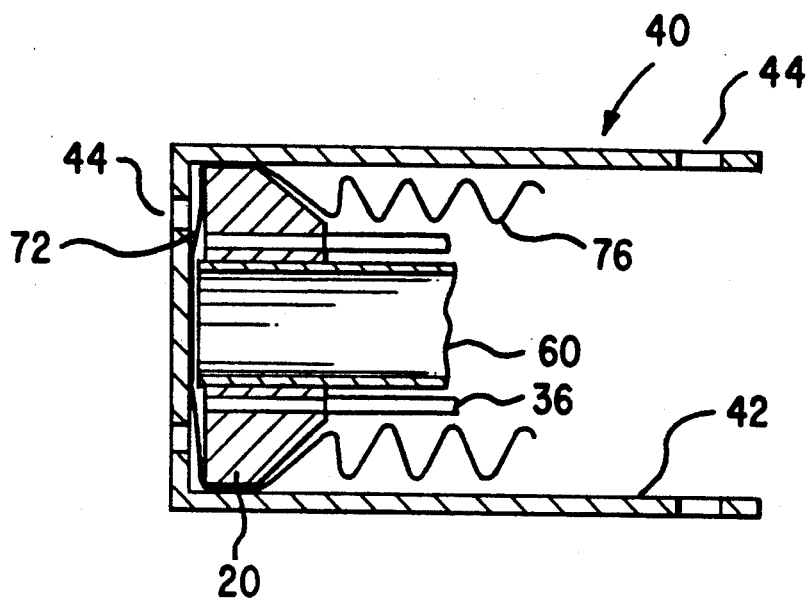
FIG. 5A is a cross-sectional view of the horizontal mold loading method of the invention, which shows the tube-like casing and hollow mold encompassingly inserted over the stuffing horn and sizing ring.

It should be noted that the tube-like casing 70 used in conjunction with the sizing ring 20 of the present invention may be either a shirred stick 74, i.e. a shirred length of casing 70 as best seen in FIG. 4A, or a mold liner 76, i.e. an unshirred precut casing segment as illustratively presented in FIG. 5A,. When a shirred stick 74 is loaded directly onto the stuffing horn 60, the casing-expanding surface 24 of the present invention deshirrs the casing 70 and eliminates wrinkles or snags to ensure the tube-like casing 70 is efficiently stuffed. Likewise, when a mold liner 76 is used, the casing-expanding surface 24 eliminates any inadvertent twists, snags or wrinkles in the liner during the stuffing operation. Additionally, and further in accordance with the present invention, the casing-expanding surface 24 applies an axial tension to the casing 70 during the stuffing operation, as will be discussed in more detail below.

In addition to the inner mounting surface 22 and the casing-expanding surface 24, the sizing ring 20 includes a front surface 26 extending radially from the mounting surface to the casing-expanding surface 24 with the front Surface 26 adapted to be positioned toward the discharge end 64 of the stuffing horn 60, and a back surface 28 located opposite the front surface 26, as illustratively demonstrated in FIGS. 1 and 2.

Further in accordance with the present invention, the sizing ring assembly includes vacuum means associated with the sizing ring for extracting air trapped within the casing between the closed end of the casing and the sizing ring. As embodied herein, and with initial regard to FIGS. 1 and 2, the vacuum means, designated generally by reference character 30, includes at least one port 32 extending through the sizing ring 20, with the port 32 configured for cooperation with a vacuum source 38 (not shown). As such, and with the casing 70 encompassingly displaced over the sizing ring 20, substantially any air trapped within the space defined by the closed end 72 of the casing 70 and the front surface 26 of the sizing ring 20 may be drawn out through the port 32 by the vacuum source 38.

In the preferred embodiments of the sizing ring assembly 10, the vacuum means 30 include a series of ports 32 spaced about the sizing ring 20. Each port 32 opens from the back surface 28 of the sizing ring 20, opposite the discharge end 64 of the stuffing horn 60, and sealingly connects with a corresponding elongate tube 36. Each tube 36 is preferably adapted to be extendable longitudinally along the outer surface 62 of the stuffing horn 60 from a respective port opening 34 in the back surface 28 of the sizing ring 20, to cooperate with a vacuum source 38. Any conventional vacuum source 38 may be used, such as a vacuum pump or the like. In this manner, the series of ports 32 may evenly and more effectively extract any trapped air within the casing 70, forward of the sizing ring 20. Of course, if desired, only a single port 32 and corresponding tube 36 may be utilized to extract the trapped air.

As readily apparent by a comparison of FIGS. 1 and 2, the ports 32 may be provided in two alternate configurations. FIG. 1 illustrative shows by example and not limitation, the ports 32 of the vacuum means 30 extending substantially longitudinally from the back surface 28 of the sizing ring 20 to the front surface 26 in a spaced apart fashion. In this configuration, the trapped air is pulled axially from within the casing 70 in a direct, efficient fashion without obstruction.

Alternatively, FIG. 2 illustratively presents the ports 32 extending substantially radially from the back surface 28 of the sizing ring 20 to the peripheral casing-expanding surface 24. In fact, the ports 32 in the preferred embodiment of FIG. 2 partially extend longitudinally inwardly from the back surface 28 before extending radially outward to the casing-expanding surface 24. As such, the trapped air is pulled across the peripheral casing-expanding surface 24 from within the casing 70, until the casing 70 is actually drawn down against the casing-expanding surface 24 In this manner, the casing 70 is effectively sealed against the sizing ring 20 by the vacuum means 30 during the stuffing operation.

Of course, additional methods of effectively sealing the casing 70 against the sizing ring 20 are available. FIGS. 4A through 4D illustratively present an embodiment of the present invention in use on a stuffing machine with at least one brake ring 66 adjacent the discharge end 64 of the stuffing horn 60. As seen in FIGS. 4A through 4D, the sizing ring assembly 10 of the present invention is configured to longitudinally oppose the brake ring 66 with the casing 70 positioned between the two, so as to effectively seal the casing 70 against the sizing ring 20 while the vacuum means 30 of the sizing ring assembly 10 extracts trapped air from within the casing 70.

In another embodiment of the present invention, the vacuumized internal sizing ring assembly 10 further includes a hollow mold for substantially encompassing the stuffing horn 60. The hollow mold, generally designated by reference character 40 in FIGS. 5A through 5D, has an internal cross-section 42 configured to slidingly receive the sizing ring 20. As seen in FIGS. 5A through 5D, the tube-like casing 70 is positioned between the hollow mold 40 and the casing-expanding surface 24 of the sizing ring 20 so as to be effectively sealed against the sizing ring 20 while the vacuum means 30 of the sizing ring assembly 10 extracts trapped air from within the casing 70. Likewise, the hollow mold 40 embodied herein includes at least one vent opening 44 for releasing air entrapped between the casing 70 and the internal cross-section 42 of the hollow mold 40 during the stuffing operation. As will be discussed in greater detail below, the preferred embodiment of the hollow mold 40 and corresponding sizing ring 20 is rectangular in shape, so as to produce a shaped product of similar rectangular shape.

Due to its simple configuration, the sizing ring 20 of the present invention may be assembled by any of a variety of conventional manufacturing processes. If a durable, long-lasting assembly is desired, the sizing ring 20 may be made from a metal or alloy material by conventional milling or mold-type manufacturing techniques. Durable metal tubes may then be welded to the port openings 34 in the back surface 28 of the sizing ring 20, or rubber tubes may be affixed to each port opening 34 by adapters or the like. Likewise, if a disposable, inexpensive assembly is preferred, the sizing ring assembly 10 may be made as a single-piece unit from a lightweight synthetic material, such as plastic, by injection molding or the like; or the sizing ring 20 and elongate tubes may be manufactured separately, and affixed together by any conventional method. Similarly, the material of construction of the hollow mold 40 is equally a matter of design choice.

The Method

In accordance with the present invention, the method for stuffing a tube-like casing having a closed end for producing a shaped product includes a series of steps to ensure that substantially any air trapped within the casing is removed during stuffing operation. Generally, the method of the present invention includes the steps of, for a stuffing horn having an outer surface and a discharge end, mounting a sizing ring assembly on the outer surface of the stuffing horn proximate the discharge end, with the sizing ring assembly including vacuum means for extracting air; inserting the casing onto the stuffing horn with the closed end of the casing positioned adjacent the discharge end of the stuffing horn and the casing displaced over the sizing ring assembly; discharging emulsion from the stuffing horn into the casing; and extracting through the vacuum means of the sizing ring assembly substantially any air trapped within the casing between the closed end and the sizing ring assembly.

Although the general method defined above may be used for producing a conventional length of stuffed casing, the method embodied herein further encompasses two alternate methods for producing shaped products. The first embodiment of the method, herein referred as slack-filling, is illustratively demonstrated by example and not limitation in FIGS. 4A through 4F. FIG. 4A shows a sizing ring assembly 10 with vacuum means 30, as discussed in detail above, mounted on a stuffing horn 60 proximate the discharge end 64. Likewise, FIG. 4A discloses the tube-like casing 70 inserted onto the stuffing horn 60 and over the sizing ring assembly 10 with the closed end 72 of the casing 70 positioned adjacent the discharge end 64 of the stuffing horn 60 in preparation for stuffing operation.

With the casing 70 properly positioned on the stuffing horn 60, the casing 70 is initially substantially free of any trapped air between its closed end 72 and the sizing ring 20. Of course, to further ensure an initial absence of trapped air, the vacuum means 30 of the sizing ring assembly 10 may be activated prior to stuffing operation to extract any possible trapped air. Once the casing 70 is positioned to satisfaction, the slack-filling method includes discharging emulsion 80 into the tube-like casing 70, as illustratively presented in FIG. 4B, and extracting substantially any air trapped within the casing 70 between the closed end 72 and the sizing ring assembly 10. It is noted that the step of extracting trapped air may be performed at any point during the stuffing operation, continuously throughout the stuffing operation, or only after completion of the discharging step.

Figure 4B:
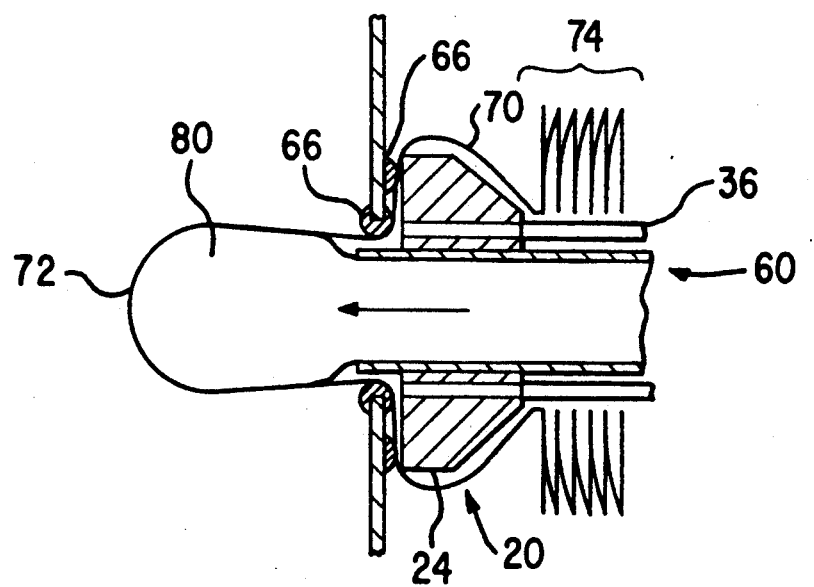
FIG. 4B is a cross-sectional view of the slack-filling method of the invention, which shows the emulsion discharged from the stuffing horn into the casing.
Figure 4C:
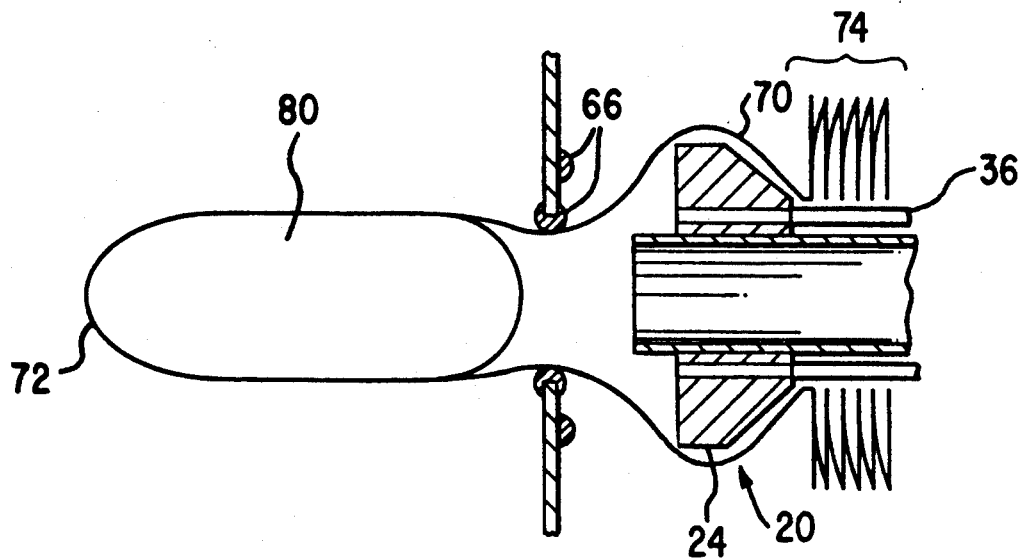
FIG. 4C is a cross-sectional view of the slack-filling method of the invention, which shows the a predetermined length of unfilled casing pulled from the stuffing horn.

In the preferred embodiment of the slack-filling method, a desired quantity of emulsion 80 is discharged into the tube-like casing 70. As seen in FIG. 4B, the tube-like casing 70 is preferably in the form of a shirred stick 74, i.e. a shirred length of tube-like casing 70. As the emulsion 80 is discharged into the casing 70, the closed end 72 is forced away from the discharge end 64 of the stuffing horn 60, thus unraveling or deshirring the shirred stick 74. Once the desired quantity of emulsion 80 has been discharged, the preferred slack-filling method includes the steps of ceasing the discharge of emulsion 80, and pulling a predetermined unfilled length of the casing 70 from the stuffing horn 60 with the casing 70 of sufficient overall length to remain displaced over the sizing ring assembly 10, as best seen in FIG. 4C. Of course, as the predetermined unfilled length of casing 70 is pulled from the shirred stick 74, it likewise deshirrs as it passes over the sizing ring assembly 10. It is noted, however, that a precut unshirred length of casing 70 may be used instead of a shirred stick 74, if desired, as long as it is of sufficient overall length to remain displaced over the sizing ring assembly 10 after the predetermined length of unfilled casing 70 is pulled.

Figure 4D:
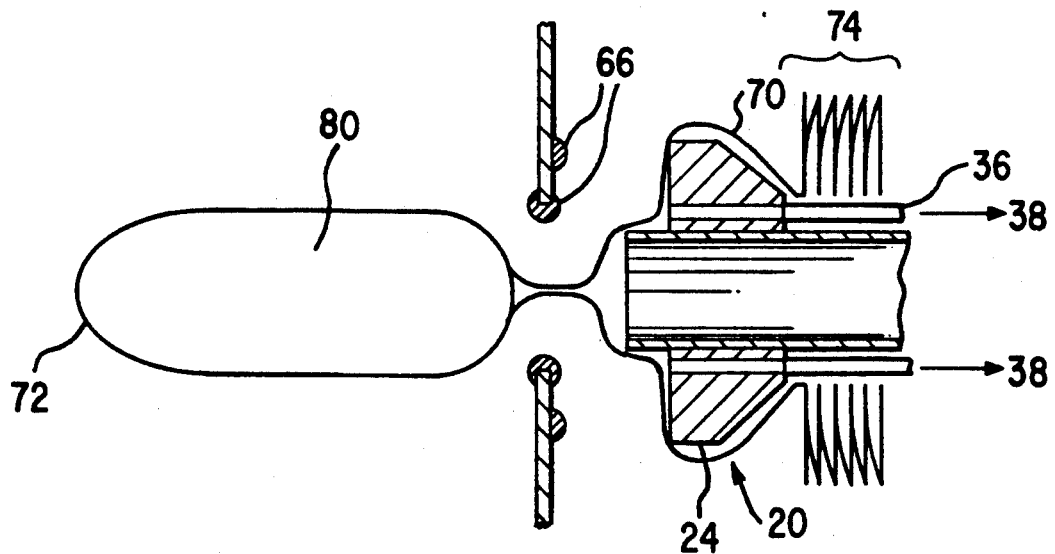
FIG. 4D is a cross-sectional view of the slack-filling method of the invention, which shows substantially any trapped air extracted from within the casing.

The slack-filling method further involves the step of extracting through the vacuum means 30 of the sizing ring assembly 10 substantially any air trapped within the casing 70 between the closed end 72 and the sizing ring assembly 10. Preferably the extracting step is initiated once the desired quantity of emulsion 80 has been discharged and discharging has been ceased, but prior to the step of pulling the predetermined unfilled length of casing 70. As such, the step of extracting any air through the sizing ring assembly 10 is continued as the predetermined unfilled length of casing 70 is pulled from the stuffing horn 60, in order to extract substantially any air remaining therein, as seen in FIG. 4D. Of course, the extracting step may also be initiated only after the pulling step has been performed, if so desired. Likewise, it is noted that while the extracting step may be also performed during the discharging step, the vacuum created within the casing 70 results in additional drag or axial tension being induced on the casing 70 as it passes over the sizing ring assembly 10, which may be undesirable in some of the embodiments of the slack-filling method of the present invention.

With the tube-like casing 70 partially unfilled and substantially free of air, the slack-filling method embodied herein further includes the step of sealing the casing 70 adjacent the discharge end 64 of the stuffing horn 60. In the preferred embodiment, the sealed end of the casing 70 is then severed from the portion of the shirred stick 74 remaining on the stuffing horn 60 to permit subsequent shaping of the stuffed, substantially air-free casing 78. As embodied herein, producing a shaped product is preformed by choosing a container mold 50 with an internal cross-section 52 similar in shape to that desired for the shaped product; placing the stuffed, substantially air-free casing 78 in the container mold 50; and compressing the stuffed, substantially air-free casing 78 so as to force the emulsion 80 to conform to the internal cross-section 52 of the container mold 50.

Figure 4E:
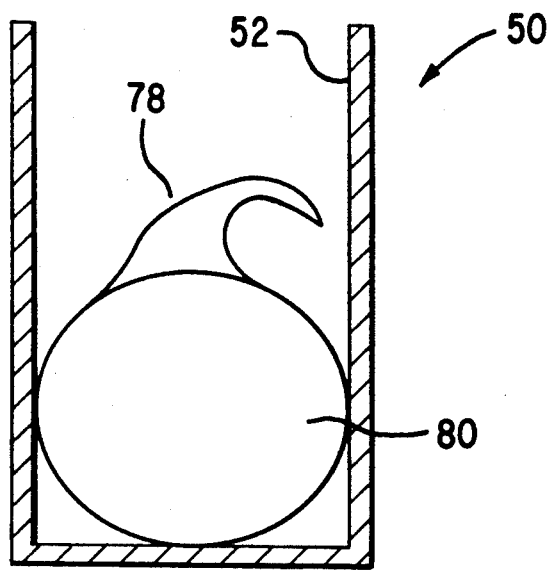
FIG. 4E is a cross-sectional view of the slack-filling method of the invention, which shows the stuffed, substantially air-free casing placed in a container mold.
Figure 4F:
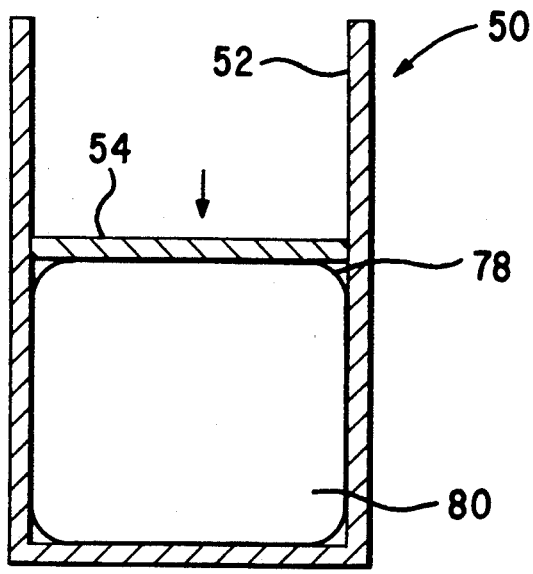
FIG. 4F is a cross-sectional view of the slack-filling method of the invention, which shows the stuffed, substantially air-free casing compressed within the container mold.

In the preferred embodiment of the slack-filling method, the container mold 50 chosen is of uniform, rectangular internal cross-section 52, as seen in FIG. 4E. For example, the internal dimensions of the rectangle may be approximately four inches by six inches to produce a shaped four inch by six inch product; or the dimensions may be approximately four inches by four inches to produce a shaped four inch square product. By choosing a container mold 50 with a uniform internal cross-section 52, the step of forcing the emulsion 80 to conform to the internal cross-section 52 can easily be performed with an adjustable lid 54 which is slidingly adjustable within the interior cross-section of the container mold 50, as illustratively presented in FIGS. 4E and 4F.

The alternate method of the present invention for producing a shaped substantially air-free product, herein referred as horizontal mold loading, is illustratively demonstrated by example and not limitation in FIGS. 5A through 5D. As previously discussed, the method of the present invention generally includes mounting a sizing ring assembly 10 proximate the discharge end 64 of a stuffing horn 60. As embodied herein, the horizontal mold loading method further includes selecting the sizing ring assembly 10 with a sizing ring 20 similar in shape to that desired for the shaped product, and choosing a hollow mold 40 having an internal cross-section 42 configured to slidingly receive the sizing ring 20.

As seen in FIG. 5A, the casing 70 is inserted onto the stuffing horn 60 with the closed end 72 of the casing 70 positioned adjacent the discharge end 64 of the stuffing horn 60 and the casing 70 displaced over the selected sizing ring 20 of desired shape. The hollow mold 40 is then inserted onto the stuffing horn 60 and slidingly over the sizing ring 20 and casing 70, to effectively seal the casing 70 against the sizing ring 20. With the casing 70 properly positioned between the hollow mold 40 and the stuffing horn 60, the casing 70 is initially free of substantially any trapped air between its closed end 72 and the sizing ring 20. However, to further ensure an initial absence of trapped air, the vacuum means 30 of the sizing ring assembly 10 can be activated prior to stuffing operation to extract any possible trapped air, as previously mentioned with regard to the slack-filling method.

Figure 5B:
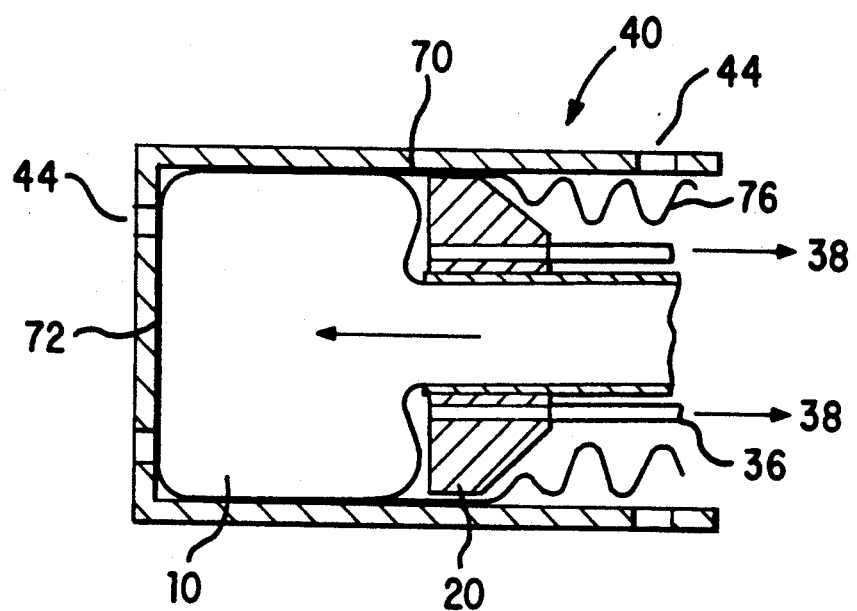
FIG. 5B is a cross-sectional view of the horizontal mold loading method of the invention, which shows the emulsion discharged from the stuffing horn into the casing and hollow mold.

Once the casing 70 is positioned to satisfaction, the horizontal mold loading method includes discharging emulsion 80 into the tube-like casing 70, as illustratively presented in FIG. 5B, and extracting substantially any air trapped within the casing 70 between the closed end 72 and the sizing ring assembly 10. As embodied herein, the discharging step is continued until a desired length of casing 70 is stuffed. Unlike the slack-filling method discussed above, the step of extracting substantially any air trapped within the casing 70 is performed throughout the discharging step. In this manner, the continuous extracting of air eliminates any risk of air voids within the emulsion 80, and induces a drag or axial tension on the casing 70 as it passes over the casing-expanding surface 24 of the sizing ring 20 to produce a more compactly stuffed product.

In the preferred embodiment of the horizontal mold loading method illustratively demonstrated in FIGS. 5A through 5D, the sizing ring 20 and internal cross-section 42 of the hollow mold 40 selected are rectangular in shape. For example, the dimensions of the rectangle may be approximately four inches by six inches to produce a shaped four inch by six inch product; or they may be approximately four inches by four inches to produce a shaped four inch square product. Likewise, and as seen in FIG. 5B, the tube-like casing 70 is preferably in the form of a mold liner 76, i.e. a precut unshirred length of tube-like casing 70 having a closed end 72. The mold liner 76 is configured to adapt to the internal cross-section 42 of the hollow mold 40, and of sufficient length to permit compact stuffing of a substantial length of the hollow mold 40.

Prior to the discharging step of the preferred horizontal mold loading method, and as best seen in FIG. 5A, the mold liner 76 and hollow mold 40 are each positioned with each of their respective closed ends adjacent the discharge end 64 of the stuffing horn 60. The step of extracting air may be initiated prior to the discharging step to remove any possible air trapped within the closed end 72 of the mold liner 76, or may be initiated simultaneously with the discharging step. As previously mentioned, the vacuum drawn within the mold liner 76 by extracting air induces an axial tension on the mold liner 76 as it is pulled across the casing-expanding surface 24.

Preferably, the discharge of emulsion 80 from the stuffing horn 60 into the mold liner 76 acts against the closed ends of the hollow mold 40 and liner to force them away from the discharge end 64 of the stuffing horn 60. However, the axial tension induced on the mold liner 76 resists such movement, thereby causing a more compact stuffing of the emulsion 80 into the mold liner 76. As a result, the emulsion 80 substantially conforms to the internal cross-section 42 of the hollow mold 40 while remaining substantially free of air. As more emulsion 80 is discharged from the stuffing horn 60, the hollow mold 40 and liner 76 are slidingly forced across the sizing ring 20 by the emulsion 80, against the resistance created by the axial tension of the mold liner 76, as seen in FIG. 5B.

It is noted that the hollow mold 40 embodied herein includes at least one vent opening 44 for releasing air entrapped between the casing 70 and the internal cross-section 42 of the hollow mold 40. This ensures that the casing 70 adapts to the entirety of the internal cross-section 42 of the hollow mold 40 during the stuffing operation to produce a shaped product with a smooth uniform outer surface. Of course, alternative means may obviously be incorporated for releasing air entrapped between the casing 70 and the internal cross-section 42 of the hollow mold 40.

Figure 5C:
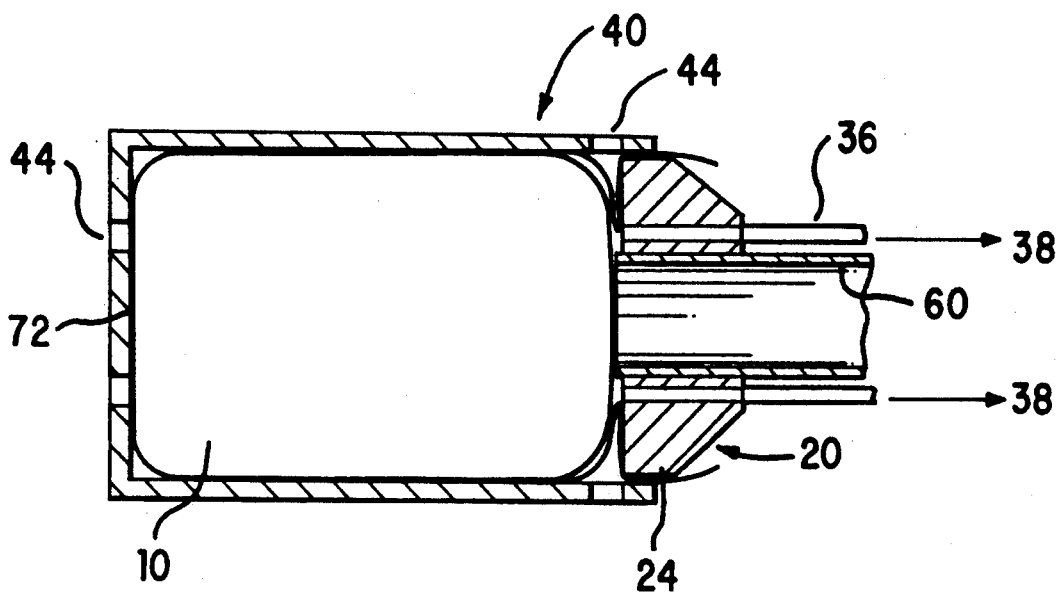
FIG. 5C is a cross-sectional view of the horizontal mold loading method of the invention, which shows the casing stuffed to a desired length with substantially any trapped air extracted from within the stuffed casing.
Figure 5D:
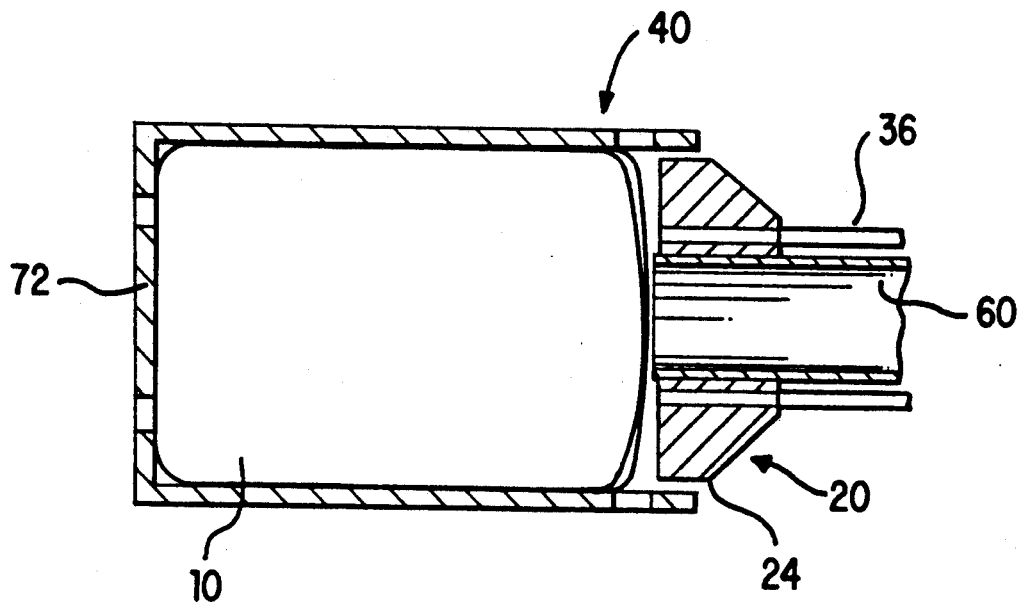
FIG. 5D is a cross-sectional view of the horizontal mold loading method of the invention, which shows the desired length of stuffed casing substantially air-free and closed.

When a desired length of casing 70 is stuffed, the discharging of emulsion 80 into the casing 70 is ceased, as seen in FIG. 5C. As embodied herein, the horizontal mold loading method further includes the step of extracting through the vacuum means 30 of the sizing ring assembly 10 substantially any trapped air remaining within the casing 70 after the ceasing step; and closing the casing 70 adjacent the discharge end 64 of stuffing horn 60, as seen in FIG. 5D. However, the final steps of extracting any remaining air and closing the casing 70 need not be performed if further processing of the shaped product is anticipated.

It will be apparent to those skilled in the art that various modifications and variations can be made in the method of using the vacuumized internal sizing ring assembly of the present invention and in construction of the sizing ring assembly without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A vacuumized internal sizing ring assembly for use on a stuffing machine to extract air from a tube-like casing having a closed end, wherein the stuffing machine includes a stuffing horn with an outer surface adapted to support the casing inserted thereon and a discharge end against which the closed end is positioned in preparation for stuffing operation, the sizing ring assembly comprising:

a sizing ring having an inner mounting surface adapted to conform to the outer surface of the stuffing horn for mounting said sizing ring proximate the discharge end with the casing displaced thereover, a peripheral casing-expanding surface to expand the casing into an open configuration as the casing is withdrawn from the stuffing horn during the stuffing operation, a front surface extending radially from the mounting surface to the casing-expanding surface with the front surface adapted to be positioned toward the discharge end, and a back surface located opposite the front surface; and vacuum means associated with said sizing ring for extracting air trapped within the casing between the closed end and said sizing ring.

2. The vacuumized internal sizing ring assembly of claim 1, wherein said vacuum means comprises at least one port extending through said sizing ring, said port configured for cooperation with a vacuum source.

3. The vacuumized internal sizing ring assembly of claim 2, wherein said vacuum means further includes a tube connected to said port for extracting the trapped air therethrough, said tube adapted to be extendable longitudinally along the outer surface of the stuffing horn from the back surface of said sizing ring.

4. The vacuumized internal sizing ring assembly of claim 2, wherein said port extends substantially longitudinally from the back surface of said sizing ring to the front surface.

5. The vacuumized internal sizing ring assembly of claim 2, wherein said port extends substantially radially from the back surface of said sizing ring to the peripheral casing-expanding surface.

6. The vacuumized internal sizing ring assembly of claim 1, wherein the stuffing machine further includes a brake ring positioned adjacent the discharge end of the stuffing horn, said sizing ring being adapted to longitudinally oppose the brake ring with the casing positioned therebetween to effectively seal the casing against said sizing ring while said vacuum means extracts trapped air.

7. The vacuumized internal sizing ring assembly of claim 1 further including a hollow mold for substantially encompassing the stuffing horn, the hollow mold having an internal cross-section configured to slidingly receive said sizing ring with the casing positioned therebetween to effectively seal the casing against said sizing ring while said vacuum means extracts the trapped air.

8. The vacuumized internal sizing ring assembly of claim 7, wherein the hollow mold includes at least one vent opening to release air entrapped between the casing and said internal cross-section of the hollow mold during the stuffing operation.

9. A method for stuffing a tube-like casing having a closed end using a stuffing horn having an outer surface and a discharge end, for producing a shaped product, the method comprising the steps of:

mounting a sizing ring assembly on the outer surface of the stuffing horn proximate the discharge end, the sizing ring assembly including vacuum means for extracting air;

inserting the casing onto the stuffing horn with the closed end positioned adjacent the discharge end of the stuffing horn and the casing displaced over the sizing ring assembly;

discharging emulsion from the stuffing horn into the casing; and extracting through said vacuum means of the sizing ring assembly substantially any air trapped within the casing between the closed end and the sizing ring assembly.

10. The method of claim 9 wherein prior to the extracting step, the method further includes the steps of:

ceasing the discharge of emulsion after a desired quantity of emulsion has been discharged; and pulling a predetermined unfilled length of the casing from the stuffing horn with the casing being of sufficient overall length to remain displaced over the sizing ring assembly; and the extracting step further including extracting substantially any air remaining within the predetermined unfilled length of the casing.

11. The method of claim 10 further including the step of sealing the casing adjacent the discharge end of the stuffing horn with the emulsion substantially free of air.

12. The method of claim 11 further including the steps of:

choosing a container mold with a desired internal cross-section;

placing the stuffed, substantially air-free casing in the container mold; and compressing the stuffed, substantially air-free casing within the container mold to force the emulsion therein to conform to said desired internal cross-section of the container mold while remaining substantially free of air.

13. The method of claim 12 wherein the inserting step further includes selecting a shirred stick as the tube-like casing to be stuffed.

14. The method of claim 9 further including the steps of:

continuing to extract the trapped air within the casing throughout the discharging step; and ceasing the discharge of emulsion into the casing when a desired length of casing has been stuffed.

15. The method of claim 14 further including the steps of:

extracting through said vacuum means of the sizing ring assembly substantially any trapped air remaining within the casing after the ceasing step; and closing the casing adjacent the discharge end of stuffing horn.

16. The method of claim 14 wherein:

the mounting step further includes selecting the sizing ring assembly with a sizing ring similar in shape to that desired for the shaped product, and choosing a hollow mold having an internal cross-section configured to slidingly receive said sizing ring with the casing positioned therebetween; and prior to the discharging step, the method further includes the step of inserting the hollow mold onto the stuffing horn and slidingly over said sizing ring and casing so that the casing is effectively sealed against said sizing ring, wherein the discharging and extracting steps result in the emulsion substantially conforming to said internal cross-section while remaining substantially free of air as the hollow mold is slidingly forced across said sizing ring by the emulsion.

17. The method of claim 16 wherein the discharging step further includes the step of releasing air entrapped between the casing and said internal cross-section of the hollow mold.

18. The method of claim 17, wherein the inserting step further includes selecting a precut mold liner as the tube-like casing to be stuffed.

* * * * *